UNITED STATES PATENT OFFICE.

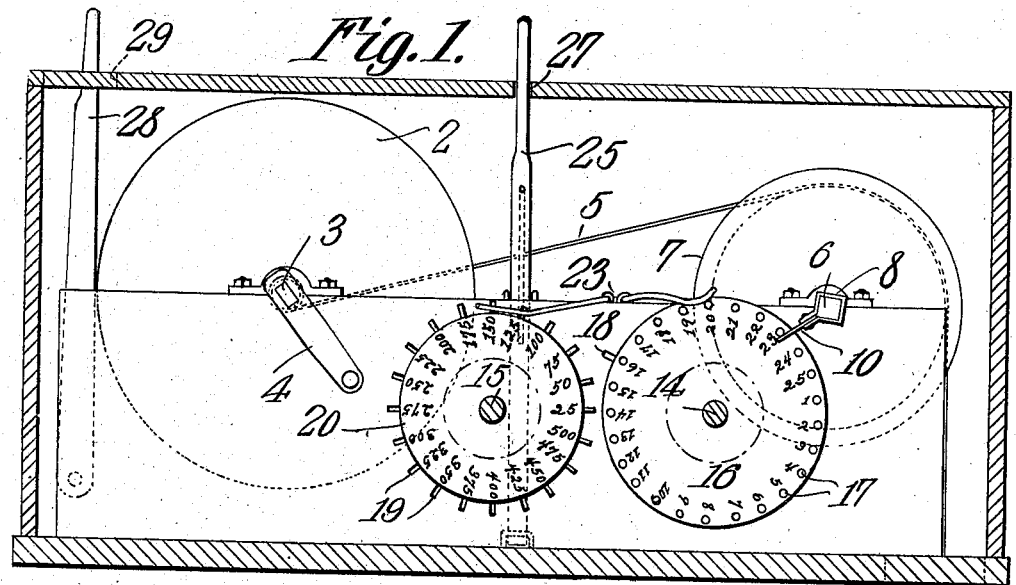

HARRY H. BROWN, OF STEWART, OHIO.

MEASURING APPARATUS FOR INDICATING DEPTHS.

No. 900,351.     Specification of Letters Patent.     Patented Oct. 6, 1908.

Application filed May 22, 1908. Serial No. 434,435.

*To all whom it may concern:*

Be it known that I, HARRY H. BROWN, a citizen of the United States, residing at Stewart, in the county of Athens and State of Ohio, have invented a new and useful Measuring Apparatus for Indicating Depths, of which the following is a specification.

This invention relates to measuring apparatus for indicating depths and is especially designed for measuring the depths of wells, etc.

Heretofore the measurement of wells has usually been accomplished by providing a marked tape of the necessary length but this has always been found objectionable because should the same break from any cause it destroys the efficiency of the entire tape. Moreover, it has been practically impossible to determine the depth if the measurement is made at night unless a light is utilized and this is obviously dangerous when gas or oil wells are being drilled.

The object of the present invention is to provide a compact measuring apparatus which can be conveniently transported from place to place and which is provided with indicators for accurately designating the depth of the well being measured.

A further object is to provide apparatus of this character utilizing an ordinary wire for measuring purposes, said wire carrying a weight so as to be held taut in frictional engagement with a wheel of the measuring apparatus. Should the wire become broken from any cause the same can be spliced and again used without destroying the efficiency of the apparatus.

A further object is to provide apparatus of this character which will accurately indicate the length of wire paid out and the indicating mechanism of which will remain in position until reset after the completion of the measurement.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a longitudinal section through the housing of the apparatus and showing the interior mechanism in elevation. Fig. 2 is a plan view of said mechanism and showing the housing in section.

Referring to the figures by characters of reference, 1, 1 designate supporting plates on which is journaled a spool 2 the shaft 3 of which has a crank 4 or other suitable device at one end thereof whereby it can be readily rotated. This spool is designed to contain a long wire 5 of any desired gage which may be readily wound thereon or unwound therefrom by means of the crank 4. A shaft 6 is journaled upon the plates 1 and has a grooved wheel 7 secured to it for the purpose of supporting the wire 5 and secured to one end of the shaft 6 is a collar 8 having parallel ears 9 between which is pivotally mounted an actuating finger 10. By mounting this finger in this manner the same can be swung in the direction of the length of the shaft so as to move into or out of operative position as hereinafter stated. The two plates 1 are mounted within a housing 11 the bottom of which has an opening 12 located beneath the grooved wheel 7 so that the end of the wire 5 is free to hang through this opening, there being a weight 13 upon the end of said wire for maintaining it normally taut and in frictional engagement with the wheel 7. The shaft 3 extends through one wall of the housing so that the crank 4 is in position to be conveniently actuated.

Journaled within one wall of the housing and one of the plates 1 are shafts 14 and 15. The shaft 14 has a disk 16 secured to it and provided with outstanding pins or projections 17 spaced apart at regular intervals and one of which is normally positioned in the path of the finger 10. A tooth or projection 18 extends from the periphery of this disk and is designed to successively contact with a series of radial pins or projections 19 extending from a disk 20 secured to shaft 15. The outer end of each shaft 14 and 15 has a knob 21 and 22, respectively, secured to it and each knob bears a series of numerals thereon designed to indicate the length of wire paid out. Spring pawls 23 bear upon the disks 16 and 20 for the purpose of retarding their rotation.

Guide rods 24 connect the plates 1 and mounted between them is a transversely movable lever 25 pivotally connected to the base of the housing and having a guide loop 26 through which the wire 5 extends. The upper end of this lever extends through a slot 27 in the top of the housing. A brake lever 28 is pivotally connected to one of the plates 1 and extends through a slot 29 in the top of the housing. This lever is designed to be shifted against one end of the spool 2 so as to retard the rotation thereof.

It is of course to be understood that before using the device for measuring a well or the like it is necessary to first wind the wire 5 onto the spool 2 and to then turn the disks 16 and 20 by means of the knobs 21 and 22 until they reach their initial or starting point. Before this rotation of the disks can be effected it is necessary to swing the finger 10 outwardly from the path of the pins 17. After the parts have been properly set the finger 10 is swung in position at right angles to shaft 6 and the wire 5 is paid out so that the weight 13 will be lowered into the well. Each rotation of the wheel 7 causes the finger 10 to move against one of the pins 17 and impart a partial rotation to disk 16. Upon the completion of the rotation of this disk the tooth or projection 18 thereon is brought into contact with one of the pins 19 on disk 20, thus imparting a partial rotation thereto. It will be apparent therefore that the two disks can be caused to indicate considerable depths. In the drawings the disk 16 has been shown arranged to indicate from 1 to 25 feet while the disk 20 indicates from 25 to 500 feet, each movement thereof representing 25 feet. It is of course to be understood, however, that these disks can be numbered in any desired manner and their proportions changed so as to indicate a greater or less number of feet. The pawls 23 serve to hold the disks in the positions to which they are shifted and after the weight 13 has reached the bottom of the well and the wire 5 has become slack the actuation of the wheel 7 will be stopped because the frictional contact of the wire therewith will not be sufficient to rotate the same. Upon the completion of the measuring operation the finger 10 is swung outwardly and the crank 4 rotated so as to wind the wire on the spool. Lever 25 can be swung from side to side so as to properly guide the wire. Lever 28 is designed to retard the paying out of the wire during the measuring operation. In the drawings, the disks 16 and 20 have been shown provided with numerals in addition to those on the knobs 21 and 22 but it is to be understood of course that the numerals upon the disks may be dispensed with, if desired, especially where a closed housing 11 is utilized.

What is claimed is:

1. The combination with a winding device, a weighted flexible device connected thereto, and a wheel supporting and actuated by said device; of a revoluble indicator, projections thereon, and means operated by the wheel for actuating the indicator, said means comprising an element revoluble with the wheel, and a projection-engaging finger pivotally connected to said element, and shiftable into and out of the path of the projections.

2. The combination with a winding device, a grooved wheel, and a weighted flexible device secured to said first named device and supported by and disposed to actuate the wheel; of a finger pivotally connected to the wheel, a revoluble disk, and a projection upon the disk and normally in the path of and disposed to be actuated by the finger, said finger being shiftable out of the path of the projection.

3. The combination with a housing; of a spool therein, a wheel journaled within the housing, an indicator carried by the housing, a flexible element secured to and disposed to be wound on to and unwound from the spool, said element being supported by and disposed to rotate the wheel, a weight connected to the outer end of said flexible element, a transversely oscillating lever within and extending beyond the housing, guides therefor, and an elongated guide loop carried by the lever and through which said flexible element extends.

4. The combination with a housing; of a spool therein, a wheel journaled within the housing, an indicator carried by the housing, a flexible element secured to and disposed to be wound on to and unwound from the spool, said element being supported by and disposed to rotate the wheel, a weight connected to the outer end of said flexible element, a transversely oscillating lever within and extending beyond the housing, guides therefor, and an elongated guide loop carried by the lever and through which said flexible element extends, means outside the housing for actuating the spool, and a brake lever within and extending beyond the housing, said lever being shiftable against the spool.

In testimony that I claim the foregoing as my own, I have hereto affixed my signature in the presence of two witnesses.

HARRY H. BROWN.

Witnesses:
N. E. KIDD,
G. H. CALDWELL.